(12) United States Patent
Beckmann et al.

(10) Patent No.: US 7,584,605 B2
(45) Date of Patent: Sep. 8, 2009

(54) INTERNAL COMBUSTION ENGINE WITH EXHAUST-GAS PURIFICATION SYSTEM, AND METHOD FOR PURIFYING THE EXHAUST GAS FROM AN INTERNAL COMBUSTION ENGINE

(75) Inventors: Thomas Beckmann, Stuttgart (DE); Alexander Massner, Esslingen (DE)

(73) Assignee: Daimler AG, Stuttgart (DE)

( * ) Notice: Subject to any disclaimer, the term of this patent is extended or adjusted under 35 U.S.C. 154(b) by 231 days.

(21) Appl. No.: 10/576,959

(22) PCT Filed: Sep. 17, 2004

(86) PCT No.: PCT/EP2004/010448

§ 371 (c)(1),
(2), (4) Date: Jan. 26, 2007

(87) PCT Pub. No.: WO2005/049984

PCT Pub. Date: Jun. 2, 2005

(65) Prior Publication Data

US 2007/0130915 A1  Jun. 14, 2007

(30) Foreign Application Priority Data

Oct. 25, 2003  (DE) ............................... 103 49 876

(51) Int. Cl.
*F01N 3/00* (2006.01)
(52) U.S. Cl. .............................. 60/295; 60/274; 60/285; 60/288; 60/301
(58) Field of Classification Search ........... 60/285–288, 60/295, 297, 301, 303, 311
See application file for complete search history.

(56) References Cited

U.S. PATENT DOCUMENTS

| 5,778,666 | A  | * | 7/1998  | Cullen et al. | 60/276 |
| 6,164,064 | A  | * | 12/2000 | Pott | 60/277 |
| 6,766,642 | B2 | * | 7/2004  | Binder et al. | 60/301 |
| 6,779,339 | B1 | * | 8/2004  | Laroo et al. | 60/297 |
| 6,832,473 | B2 | * | 12/2004 | Kupe et al. | 60/286 |
| 7,198,764 | B2 | * | 4/2007  | Fisher et al. | 422/186.04 |
| 7,332,135 | B2 | * | 2/2008  | Gandhi et al. | 422/177 |

FOREIGN PATENT DOCUMENTS

DE  101 13 947 A1  9/2002

OTHER PUBLICATIONS

International Search Report and PCT/ISA/237 dated Feb. 15, 2005, including an English Translation of the relevant portion (Ten (10) pages).

* cited by examiner

*Primary Examiner*—Thomas E Denion
*Assistant Examiner*—Diem Tran
(74) *Attorney, Agent, or Firm*—Crowell & Moring LLP

(57) ABSTRACT

An exhaust-gas purification system and method are provided for an internal combustion engine having an NOx storage catalytic converter and a downstream SCR catalytic converter. The NOx storage catalytic converter can be supplied in a first operating mode with an oxidizing exhaust gas and in a second operating mode with a reducing exhaust gas. A third operating mode is provided between the first operating mode and the second operating mode, in which an exhaust gas which has a lower content of oxidizing constituents than the first operating mode and a lower content of reducing constituents than the second operating mode can be supplied to the NOx storage catalytic converter to improve $NH_3$ production at the start of converter regeneration.

4 Claims, 2 Drawing Sheets

INTERNAL COMBUSTION ENGINE WITH EXHAUST-GAS PURIFICATION SYSTEM, AND METHOD FOR PURIFYING THE EXHAUST GAS FROM AN INTERNAL COMBUSTION ENGINE

This application is a national phase application of International application PCT/EP2004/010448 filed Sep. 17, 2004 and claims the priority of German application No. 103 49 876.1, filed Oct. 25, 2003, the disclosure of which are expressly incorporated by reference herein.

BACKGROUND AND SUMMARY OF THE INVENTION

The invention relates to The invention relates to an internal combustion engine having an exhaust-gas purification system with a nitrogen oxide storage catalytic converter and an SCR catalytic converter connected downstream of the nitrogen oxide storage catalytic converter, in which the nitrogen oxide storage catalytic converter can be supplied in three operating modes with excess oxidizing constituents, excess reducing constituents, and lower levels of both constituents. The invention also relates to a related method for purifying the exhaust gas from an internal combustion.

Laid-Open Specification DE 101 13 947 A1 has disclosed an exhaust-gas purification system for an internal combustion engine having a nitrogen oxide storage catalytic converter, in which, in regeneration phases of the nitrogen oxide storage catalytic converter, ammonia ($NH_3$) is released by the latter and is used to remove nitrogen oxides (NOx) in an SCR catalytic converter connected downstream as seen in the direction of flow. In the corresponding exhaust-gas purification method, NOx is removed from the exhaust gas during a lean-burn mode of the internal combustion engine by being accumulated in the catalyst material of the nitrogen oxide storage catalytic converter. Once it is saturated, the nitrogen oxide storage catalytic converter is regenerated during a rich engine operating mode. According to DE 101 13 947 A1, during this regeneration in a first phase an exhaust gas which is relatively highly enriched with reducing agents is supplied to the nitrogen oxide storage catalytic converter. In a second phase of the regeneration, by contrast, an exhaust gas with a lower reducing agent content is supplied to the nitrogen oxide storage catalytic converter. NOx which has accumulated in the catalyst material of the nitrogen oxide storage catalytic converter is reduced to form $NH_3$, which is supplied to the downstream SCR catalytic converter and accumulated therein. During the lean operating phase which follows the regeneration, NOx which passes through the nitrogen oxide storage catalytic converter can be selectively reduced in the SCR catalytic converter. The $NH_3$ which has previously been accumulated in the SCR catalytic converter serves as a selectively acting reducing agent. In this way, the nitrogen-oxide-lowering properties of the nitrogen oxide storage catalytic converter and of the SCR catalytic converter complement one another. However, a sufficient supply of $NH_3$ to the SCR catalytic converter is important for efficient reduction of the levels of NOx.

It is an object of the invention to provide an internal combustion engine having an exhaust-gas purification system and a method for purifying the exhaust gas from an internal combustion engine of the type described in the introduction, with which overall the highest possible nitrogen oxide purification action is achieved.

The internal combustion engine according to the invention has an exhaust gas purification system comprising a nitrogen oxide storage catalytic converter and an SCR catalytic converter connected downstream of the nitrogen oxide storage catalytic converter, wherein the nitrogen oxide storage catalytic converter can be supplied in a first operating mode with exhaust gas containing an excess of oxidizing constituents and in a second operating mode with exhaust gas containing an excess of reducing constituents. According to the invention, a third operating mode is provided, in terms of time, after the first operating mode and before the second operating mode, in which third operating mode the nitrogen oxide storage catalytic converter can be supplied with an exhaust gas which has a lower content of oxidizing constituents than the first operating mode and a lower content of reducing constituents than the second operating mode.

It is known that the chemical reduction of NOx to form $NH_3$ requires an environment with a chemically reducing action. As has surprisingly been found, however, even relatively small residual quantities of oxidizing constituents and in particular of oxygen have a lasting adverse effect on the efficiency of $NH_3$ formation even in relatively strongly reducing conditions. Since the nitrogen oxide storage catalytic converter used is either a honeycomb body with passages passing through it or a bulk bed of shaped bodies, in the event of a sudden change in the exhaust-gas composition from oxidizing to reducing, the exhaust gases of different compositions become mixed with one another in the cavities formed by these catalyst converter structures. This mixing briefly results in relatively powerful reactions, impeding the reduction of NOx accumulated in the catalyst material to form $NH_3$, on account of the oxygen still being present. Instead, NOx can even be suddenly released and then leave the nitrogen oxide storage catalytic converter without being reduced, in the form of what is known as NOx breakthrough. This has an adverse effect on the purifying action of the exhaust-gas purification system. Conversely, in particular at the beginning of nitrate regeneration, when relatively large quantities of NOx are still stored in the catalyst material of the nitrogen oxide storage catalytic converter, effective NOx reduction with a high level of $NH_3$ being formed is desirable. This is achieved by a third operating mode, in which the nitrogen oxide storage catalytic converter is supplied with an exhaust gas which has a lower oxygen content than the first operating mode and a lower reducing agent content than the second operating mode, being established in terms of time after the first operating mode and before the second operating mode.

In the third operating mode, the gas of the first operating mode which is present in the cavities in the catalytic converter body is replaced by a gas which has a lower content of highly reactive constituents than the first operating mode and the second operating mode. This avoids the undesirable effects which have been mentioned above and creates conditions in the nitrogen oxide storage catalytic converter which improve the formation of $NH_3$ in the subsequent second operating mode. Therefore, the SCR catalytic converter connected downstream of the nitrogen oxide storage catalytic converter can be supplied with a relatively large quantity of $NH_3$, which correspondingly improves its efficiency. In particular, in the third operating mode the oxygen content of the exhaust gas which is present in the nitrogen oxide storage catalytic converter is lowered, and as a result the $NH_3$ yield is improved during the NOx reduction in the storage catalytic converter.

The setting of the exhaust-gas composition in the individual operating modes can be performed by the internal combustion engine, which may be implemented as a diesel engine or as a spark-ignition engine and has suitable control devices which allow corresponding internal combustion engine operating modes. However, the setting of the exhaust-gas composition can crucially also be performed or assisted by a gas-delivering additional device in at least one of the operating modes.

In one configuration of the invention, the nitrogen oxide storage catalytic converter is designed as an arrangement of a first nitrogen oxide storage catalytic converter element and a second nitrogen oxide storage catalytic converter element which is connected parallel in terms of flow with the first nitrogen oxide storage catalytic converter element. This gives rise to the possibility of actuating the two nitrogen oxide storage catalytic converter elements separately and operating them at offset times in the individual operating modes. This can likewise improve the supply of $NH_3$ to the SCR catalytic converter connected downstream of the nitrogen oxide storage catalytic converter elements. The separate actuation of the nitrogen oxide storage catalytic converter elements can be achieved, for example, by enabling them to be connected to different cylinders of the internal combustion engine and the cylinders being operated with different air/fuel mixes.

In a further configuration of the invention, the first nitrogen oxide storage catalytic converter element and the second nitrogen oxide storage catalytic converter element can be operated alternately either in the first operating mode or in the second operating mode and third operating mode. Therefore, by way of example, the first nitrogen oxide storage catalytic converter element is acted on by oxidizing exhaust gas from lean-burn cylinders, while the second nitrogen oxide storage catalytic converter element is operated in the third or second operating mode and is therefore acted on by low-oxygen or reducing exhaust gas.

In a further configuration of the invention, a switching device is provided, in such a manner that the nitrogen oxide storage catalytic converter element which is operating in the second operating mode and/or in the third operating mode can be at least partially isolated from the exhaust-gas stream released from the internal combustion engine. As a result, the exhaust-gas stream passing through the nitrogen oxide storage catalytic converter element which is being operated in the second operating mode and/or in the third operating mode can be lowered to a greater or lesser extent, which facilitates the change in the exhaust-gas composition in the nitrogen oxide storage catalytic converter element, since a smaller quantity of gas is affected. The switching device may in this case be designed, for example, as an exhaust-gas flap which diverts the exhaust-gas stream and is connected upstream of the nitrogen oxide storage catalytic converter elements.

In a further configuration of the invention, a gas delivery device is provided, in such a manner that the nitrogen oxide storage catalytic converter, which is operated in the second operating mode and/or in the third operating mode, can be acted on by a gas stream delivered by the gas delivery device. This configuration of the invention allows the depletion of the oxygen content in the exhaust gas or the enrichment of the reducing agent content in the exhaust gas for the nitrogen oxide storage catalytic converter which is being operated in the third and/or second operating mode to be performed at least in part by the gas delivery device. This can make the change in internal combustion engine operation more moderate.

The gas delivery device provided may be a single cylinder or a plurality of combined cylinders of the internal combustion engine or an external unit. The latter case is advantageous, in particular with a parallel connection of two nitrogen oxide storage catalytic converter elements, if the nitrogen oxide storage catalytic converter element which is affected by the gas change can be completely or partially isolated from the main exhaust-gas stream from the internal combustion engine. If appropriate, it is then even possible to completely dispense with a change in internal-combustion engine operation and to enable the internal combustion engine to be continuously operated in lean-burn mode. The change in the gas composition in the third or second operating mode compared to the first operating mode is in this case effected exclusively by the gas delivery unit.

In a further configuration of the invention, a low-oxygen gas stream can be delivered by the gas delivery device. The gas delivery device preferably enables a low-oxygen gas with a different reducing agent content to be delivered. Therefore, the oxygen depletion of the exhaust gas which flows through the nitrogen oxide storage catalytic converter operated in the third operating mode is carried out predominantly or completely by the gas delivery device. Similarly, the reducing agent depletion of the exhaust gas in the second operating mode can likewise be performed by the gas delivery device.

In a further configuration of the invention, the gas delivery device is designed as a fuel reformer or as a burner. It is preferable for the fuel reformer or the burner to be operated with the fuel of the internal combustion engine. The fuel preparation carried out in the gas delivery unit can in this case be catalytically assisted.

In a further configuration of the invention, a catalytic converter element with an oxidation catalytic action is connection upstream of the nitrogen oxide storage catalytic converter. By way of example, an oxidation catalytic converter or a three-way catalytic converter is suitable for use as this catalytic converter element. The catalytic converter element with an oxidation catalytic action catalyzes the reaction of reducing agents with oxygen, so that an excess of oxygen or reducing agents in the exhaust gas can be lowered. Therefore, the result of this configuration of the invention is that in the third operating mode the nitrogen oxide storage catalytic converter receives a relatively inert exhaust gas, so that the formation of $NH_3$ in the subsequent third operating mode is not impeded by excess oxygen.

In a further configuration of the invention, a particulate filter is connected upstream of the SCR catalytic converter. Therefore, the exhaust-gas purification action of the exhaust-gas purification installation, in addition to lowering the nitrogen oxide levels, also comprises lowering the particulate levels, which is advantageous in particular in the case of an internal combustion engine in the form of a diesel engine. The particulate filter may be arranged immediately upstream of the SCR catalytic converter or may also be connected upstream of the nitrogen oxide storage catalytic converter.

The method according to the invention for purifying the exhaust gas from an internal combustion engine provides that a nitrogen oxide storage catalytic converter is supplied in a first method step with exhaust gas containing an excess of oxidizing constituents, with nitrogen oxides being removed from the exhaust gas by being accumulated in the nitrogen oxide storage catalytic converter, in a second method step with exhaust gas containing an excess of reducing constituents, with nitrogen oxide which has been accumulated in the nitrogen oxide storage catalytic converter being at least partially reduced to $NH_3$, and in a third method step, which in terms of time is carried out after the first method step and before the second method step, with an exhaust gas which has a lower content of oxidizing constituents than in the first method step and a lower content of reducing constituents than in the second method step. In the third method step, therefore, the feed lines leading to the nitrogen oxide storage catalytic converter and also the nitrogen oxide storage catalytic converter itself are purged with a virtually inert exhaust gas, and the relatively high oxygen content of the exhaust gas in the cavities in the catalytic converter is lowered. As a result, during the transition to the second method step, reactions which take place in the nitrogen oxide storage catalytic converter are much less powerful, and favorable conditions are preset for the $NH_3$ formation in the second method step in the nitrogen oxide storage catalytic converter.

In one configuration of the method, the third method step is terminated at the earliest when the nitrogen oxide storage catalytic converter has been predominantly filled by exhaust gas delivered in the third method step. In this context, the filling of the catalytic converter is to be understood as meaning the filling of the cavities which are present therein. This ensures that the gas column with a relatively high oxygen content which results from the first method step is predominantly flushed out of the nitrogen oxide storage catalytic converter.

In a further configuration of the method, in the case of a nitrogen oxide storage catalytic converter formed as a parallel arrangement of a first nitrogen oxide storage catalytic converter element and a second nitrogen oxide storage catalytic converter element, the first nitrogen oxide storage catalytic converter element and the second nitrogen oxide storage catalytic converter element are operated alternately, via a switching device, in the first method step or in the second and third method steps. As a result, a continuous operation of the exhaust-gas purification system with regard to the removal of NOx by accumulation in the catalyst material of the nitrogen oxide storage catalytic converter and by reduction in the SCR catalytic converter is achieved.

In a further configuration of the method, the exhaust gas which is supplied to the nitrogen oxide storage catalytic converter in the second method step and/or in the third method step is at least partially delivered by a gas delivery unit which is designed as a fuel reformer or as a burner. As a result, there is no need for a very major change in the air/fuel ratio when the internal combustion engine is operating, and the internal combustion engine can if appropriate even be operated continuously under lean-burn conditions, because the change in the composition of the exhaust gas which flows through the nitrogen oxide storage catalytic converter is in part effected by the gas delivery unit.

In a further configuration of the method, in the second and third method steps the oxygen content of the exhaust gas is catalytically lowered upstream of the nitrogen oxide storage catalytic converter. For this purpose, a catalytic converter element with an oxidation catalyst action is preferably connected upstream of the nitrogen oxide storage catalytic converter. One advantage of this configuration of the method is that the heat of reaction which is released at this catalytic converter element can be utilized to increase the temperature of the nitrogen oxide storage catalytic converter connected downstream.

In a further configuration of the method, the temperature of the nitrogen oxide storage catalytic converter element is influenced, according to the temperature dependency of its efficiency, by adjusting the switching device. In the case of an internal combustion engine which is operated in lean-burn mode, it is preferable for the switching device, which is configured for example as an exhaust-gas flap, to be actuated in such a way that a predeterminable fraction of the oxidizing exhaust gas is passed into the exhaust-gas branch in which the nitrogen oxide storage catalytic converter element which is being operated in the third or second method step is arranged. Reaction of oxygen with reducing agents releases heat of reaction which is utilized to heat the components connected downstream. This can lead to these component being operated in a temperature range of optimum efficiency.

Other objects, advantages and novel features of the present invention will become apparent from the following detailed description of the invention when considered in conjunction with the accompanying drawings for example.

DETAILED DESCRIPTION

Figure 1:
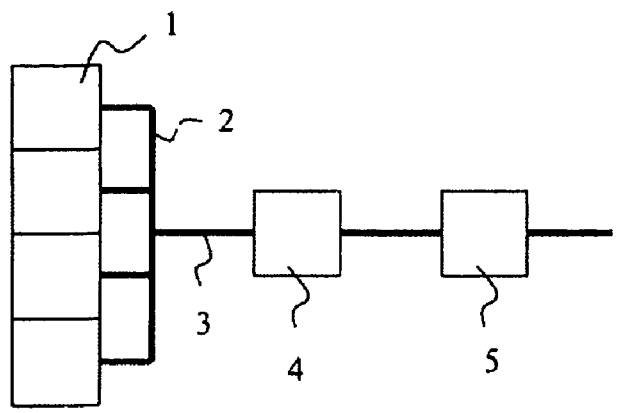
FIG. 1 shows a schematic block diagram of a first embodiment of an internal combustion engine with associated exhaust-gas purification system with nitrogen oxide storage catalytic converter and SCR catalytic converter.

FIG. 1 diagrammatically depicts an internal combustion engine 1 with an exhaust-gas purification system which comprises a nitrogen oxide storage catalytic converter 4 and an SCR catalytic converter 5 connected downstream of the nitrogen oxide storage catalytic converter 4, which catalytic converters are arranged in an exhaust pipe 3 of the internal combustion engine 1. The catalytic converters 4, 5 are preferably designed as honeycomb monoliths with passages passing through them, through which the exhaust gas supplied can flow.

Although the internal combustion engine 1 may also be designed as a spark-ignition engine capable of running in lean-burn mode, the text which follows assumes that the internal combustion engine 1 is a diesel engine. The cylinders of the diesel engine 1 in this case, by way of example, release their exhaust gas to the exhaust pipe 3 via a common exhaust manifold 2. Sensors (not shown here) for recording the exhaust-gas composition and the temperature of the exhaust gas and of the catalytic converters 4, 5 are expediently provided. These sensors can serve as signal transmitters for example for controlling the air/fuel ratio of the air/fuel mix which is burnt in the cylinders of the diesel engine 1. An engine control unit, which is not illustrated for the sake of clarity, is provided for the purpose of controlling the diesel engine 1. Of course, further components (not illustrated here), such as for example an exhaust-gas turbo charger or an exhaust-gas recirculation, can be assigned to the diesel engine 1. The diesel engine 1 can preferably be actuated in such a way that it can be operated with changing air/fuel ratios $\lambda_M$. The air/fuel ratio $\lambda_M$ is to be understood, in the usual way, as meaning the stoichiometry ratio of the fuel and combustion air fed to the cylinders of the diesel engine. $\lambda$ Values greater than 1 correspond to lean-burn operation of the diesel engine, and $\lambda$ values less than 1 correspond to rich-burn operation of the diesel engine. Accordingly, a lean exhaust gas with an excess of constituents with an oxidizing action, such as in particular oxygen, results from lean-burn engine operation, and a rich exhaust gas containing an excess of reducing constituents, such as for example carbon monoxide, hydrogen and hydrocarbons, results during a rich-burn engine mode. In the text which follows, the exhaust-gas composition is characterized by the air/fuel ratio $\lambda_A$ analogously to the definition given above.

The nitrogen oxide storage catalytic converter 4 has the ability to accumulate NOx which is present in the exhaust gas under oxidizing conditions, primarily by chemical bonding in nitrate form to the coating material. During this operating mode, which is referred to below as the first operating mode, increasing saturation occurs, and consequently, the nitrogen oxide storage catalytic converter has to be regenerated again from time to time during what is known as nitrate regeneration. During this regeneration, accumulated NOx is released again under reducing conditions and largely converted into nitrogen and $NH_3$. In the text which follows, the operating conditions which are set in this case are referred to below overall as the second operating mode. To allow use to be made of the NOx purifying action of the nitrogen oxide storage catalytic converter 4, therefore, a constant switch between the first operating mode with an oxidizing exhaust-gas composition with an air/fuel ratio $\lambda_A$ greater than one and the second operating mode with an air/fuel ratio $\lambda_A$ less than one is required. For reasons of fuel consumption, however, the aim is for the lean-burn operating mode to take up a large proportion of the time. Accordingly, it is desirable for the provision of a reducing exhaust-gas composition, and accordingly a low level of reducing agents, is desirable for a relatively low proportion of the time. The oxidizing exhaust-gas composition in the first operating mode is inevitably achieved during normal lean-burn operating of the diesel engine 1. The supply of reducing exhaust gas to the nitrogen oxide storage catalytic converter 4 in the second operating mode can be achieved by means of rich-burn operation of the diesel engine 1 or by post-engine enrichment of the exhaust gas, as is explained in more detail below.

The SCR catalytic converter 5 arranged downstream of the nitrogen oxide storage catalytic converter 4 has the property, which is also known for example from power plant engineering, of being able to accumulate $NH_3$ under reducing conditions and of being able to make use of this accumulated $NH_3$ and any $NH_3$ which is supplied, under oxidizing conditions, as a reaction partner in a selective catalytic reduction reaction, forming nitrogen, for the chemical reduction of NOx.

The latter property is utilized in particular in order to render NOx supplied to the SCR catalytic converter 5 harmless. The SCR catalytic converter 5 receives NOx, in the arrangement shown in FIG. 1, for example through increasing NOx slippage resulting from the increasing drop in the NOx holding capacity of the nitrogen oxide storage catalytic converter 4 over the course of the NOx accumulation when the diesel engine is operating in lean-burn mode. Moreover, in particular at the start of nitrate regeneration, a breakthrough of suddenly released nitrogen oxides can occur. However, a precondition for high efficiency of the SCR catalytic converter 5 is that it has previously had suitable quantities of $NH_3$ made available to it for storage. Since, in the arrangement shown in FIG. 1, the nitrogen oxide storage catalytic converter 4 constitutes the only source of $NH_3$, it is advantageous for the NOx which has been accumulated in the nitrogen oxide storage catalytic converter 4 to be reduced with the greatest possible efficiency to form $NH_3$ and then supplied to the downstream SCR catalytic converter 5. In this context, the minimum possible consumption of reducing agents is desirable.

According to the invention, impeding of the $NH_3$ formation is avoided by the oxygen content of the exhaust gas which is present in the cavities of the nitrogen oxide storage catalytic converter 4 being lowered prior to reducing conditions being set in the nitrogen oxide storage catalytic converter 4. This is achieved by a third operating mode, in which the nitrogen oxide storage catalytic converter 4 is supplied with an exhaust gas which has a lower oxygen content than in the first operating mode and a lower reducing agent content than in the second operating mode, being set in terms of time after the first operating mode and before the second operating mode.

Figure 2:
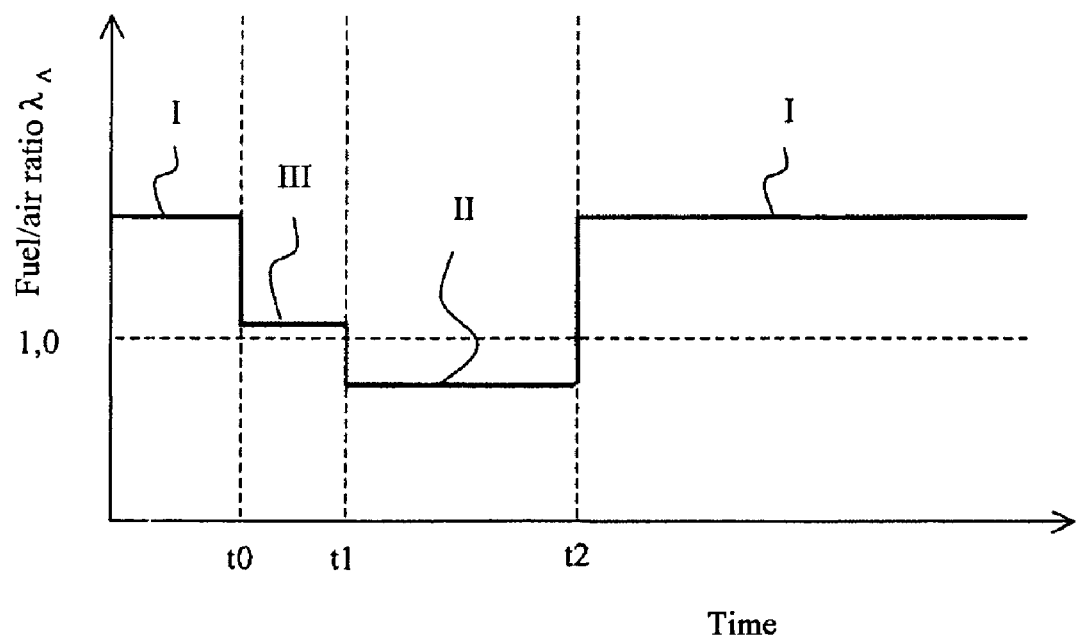
FIG. 2 shows a diagram illustrating the time curve of the air/fuel ratio $\lambda_A$ of the exhaust gas supplied to the nitrogen oxide storage catalytic converter of FIG. 1 in various operating modes.

The text which follows, with reference to FIG. 2, provides a more detailed explanation of the conditions which are set in the operating modes and the method steps which take place in succession, reference also being made to FIG. 1. The diagram presented in FIG. 2 diagrammatically depicts a preferred time curve of the air/fuel ratio $\lambda_A$ of the exhaust gas supplied to the nitrogen oxide storage catalytic converter in the various operating modes. In a first method step, first of all, the first operating mode I is set, in which a lean exhaust gas with a high oxygen content is supplied to the nitrogen oxide storage catalytic converter 4. This lean exhaust gas is delivered by the diesel engine 1, which is operated with an air/fuel ratio of, for example, $\lambda_M=3$. NOx which is emitted by the diesel engine 1 and contained in the exhaust gas is in this case at least partially accumulated in the catalyst material of the nitrogen oxide storage catalytic converter 4, preferably in the form of nitrates, and is in this way at least partially removed from the exhaust gas. Any NOx which passes through the nitrogen oxide storage catalytic converter 4 (NOx slippage) is rendered at least partially harmless by reduction in the downstream SCR catalytic converter 5.

If, as the NOx saturation of the nitrogen oxide storage catalytic converter 4 increases, an NOx slippage which has risen to unacceptable levels is established by sensor means, at time t0 the engine is switched to the third operating mode III. In this operating mode, an exhaust gas with a much lower oxygen content than in the first operating mode I is supplied to the nitrogen oxide storage catalytic converter 4. This is preferably achieved by resetting the diesel engine operating mode to an air/fuel ratio $\lambda_M$ which is slightly above 1.0, for example $\lambda_M=1.05$. For this purpose, it is advantageous for a postinjection of fuel to be carried out in one or more cylinders of the diesel engine 1, preferably in the expansion stroke between approximately 20° and 120° crank angle after top dead center or in the exhaust stroke. In addition, intake-air throttling of the diesel engine 1 and/or an increase in the exhaust-gas recirculation rate may be advantageous. Under these conditions, the exhaust gas fed to the nitrogen oxide storage catalytic converter 4 has an oxygen excess of 1% or less and a weakly oxidizing action.

During this method step, the exhaust gas with a high oxygen content from the first operating mode I which was previously set is flushed out of the cavities of the nitrogen oxide storage catalytic converter 4. While the slight excess of oxygen is present in the exhaust gas, there is as yet no or no significant reduction of accumulated nitrogen oxides in the nitrogen oxide storage catalytic converter 4. The third operating mode III which is set is preferably terminated at a time t1 at which the flushing operation has concluded and the cavities of the nitrogen oxide storage catalytic converter 4 have predominantly been filled with the low-oxygen, low-reducing-agent exhaust gas provided in the third operating mode III.

Then, at time t1, in a further method step the engine is switched to the second operating mode II, and a reducing exhaust gas with an air/fuel ratio $\lambda_A$ of preferably between 0.80 and 0.95 is supplied to the nitrogen oxide storage catalytic converter 4, during which period the nitrate regeneration of the nitrogen oxide storage catalytic converter 4 is carried out. A relatively large proportion of the NOx which has accumulated in the nitrogen oxide storage catalytic converter 4 is reduced to form $NH_3$ and supplied to the downstream SCR catalytic converter 5, where it is accumulated.

To provide the exhaust gas containing reducing agent in the second operating mode II, it is possible to provide for a corresponding lowering of the air/fuel ratio $\lambda_M$ of the overall air/fuel mix fed to the diesel engine 1. In this case, the diesel engine 1 overall is operated in a correspondingly rich-burn mode with an air/fuel ratio $\lambda_M$ which corresponds to the air/fuel ratio $\lambda_A$ of the exhaust gas. For this purpose, as described above, it is likewise possible to perform a postinjection of fuel and if appropriate at the same time throttling on the air supply side. However, it is also possible to provide for the enriching of the exhaust gas supplied to the nitrogen oxide storage catalytic converter 4 with reducing agents to be carried out in such a way that only a predeterminable proportion of the cylinders of the diesel engine 1 are operated in rich-burn mode, while the remainder of the cylinders continue to be operated with the air/fuel ratio which has been set in the preceding third operating mode III.

Furthermore, a separate gas delivery unit (not shown in FIG. 1) can be provided for the purpose of enriching the exhaust gas supplied to the nitrogen oxide storage catalytic converter 4 with reducing agents. This gas delivery unit may be designed, for example, as a fuel reformer or fuel burner. The gas delivered by the gas delivery unit is in this case supplied to the exhaust pipe 3 upstream of the nitrogen oxide storage catalytic converter 4. Finally, it may likewise be advantageous for a reducing agent which is present on board the vehicle, for example the diesel fuel, to be introduced into the exhaust gas upstream of the nitrogen oxide storage catalytic converter 4 for the purpose of enriching the exhaust gas. The enriching of the exhaust gas downstream of the engine allows operation of the diesel engine 1 with an air/fuel ratio $\lambda_M$ of less than 1.0, which is often difficult to set, to be avoided.

The second operating mode II is terminated at time t2, and in a further method step the conditions of the first operating mode I are reset when the nitrate regeneration of the nitrogen oxide storage catalytic converter 4 has ended. This can be established by sensor means or initiated by a corresponding calculation model.

The purification action of the exhaust-gas purification system, in the context of the method steps explained, can be improved further if a catalytic converter element with an oxidation catalyst action (not illustrated in FIG. 1) is arranged in the exhaust pipe 3 upstream of the nitrogen oxide storage catalytic converter 4. This catalytic converter element with an oxidation catalyst action can be used to effectively lower or remove oxygen levels or reducing agent levels in the exhaust gas. The exhaust gas which then flows out of the catalytic converter element can therefore be regarded as relatively inert, since it has a reduced content of relatively reactive constituents. In addition, it is in this way possible to heat the exhaust gas and components arranged downstream. This is advantageous in particular in conjunction with a particulate filter, which is not illustrated in FIG. 1 and may expediently be arranged in the exhaust pipe 3 upstream of the SCR catalytic converter 5. For this purpose, by way of example, the diesel engine 1 provides an oxygen-containing gas which is additionally enriched with reducing agents at the engine by postinjections or by means of the abovementioned gas delivery unit or by introduction of liquid or vaporized fuel into the exhaust section. In this way, exothermic oxidation reactions at the catalytic converter element with an oxidation catalytic action are ensured. The heat of reaction which is released can be used to very effectively bring downstream components with a purification action in the exhaust section 3 to their required operating temperature.

Figure 3:
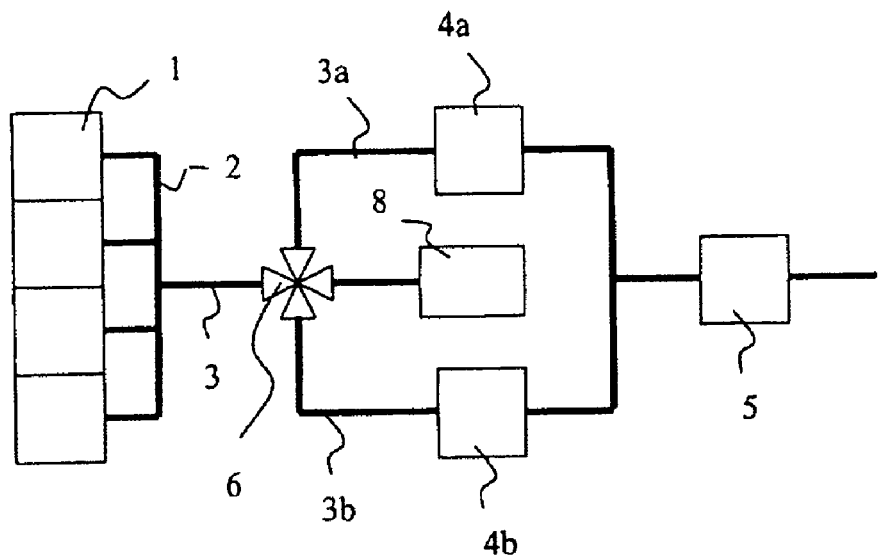
FIG. 3 shows a schematic block diagram of a second embodiment of an internal combustion engine with associated exhaust-gas purification system with nitrogen oxide storage catalytic converter and SCR catalytic converter.

FIG. 3 illustrates a schematic block diagram of a further advantageous embodiment of the internal combustion engine according to the invention with associated exhaust-gas purification system with nitrogen oxide storage catalytic converter and SCR catalytic converter, functionally equivalent components being provided with the same reference designations as in FIG. 1. The embodiment illustrated in FIG. 3 differs from that shown in FIG. 1 by virtue of the fact that the nitrogen oxide storage catalytic converter 4 is designed as a parallel arrangement of a first nitrogen oxide storage catalytic converter element 4a and a second nitrogen oxide storage catalytic converter element 4b. Furthermore, there is a switching device 6 which enables the exhaust-gas stream supplied to it through the exhaust pipe 3 to be distributed as desired between the nitrogen oxide storage catalytic converter elements 4a, 4b via the exhaust pipe branches 3a and 3b. It is preferable for the switching device 6 to be designed as a switching valve, in such a way that the exhaust gas can be supplied substantially either to the first nitrogen oxide storage catalytic converter element 4a or to the second nitrogen oxide storage catalytic converter element 4b. The exhaust pipe branches 3a, 3b are combined again on the outlet side of the nitrogen oxide storage catalytic converter elements 4a, 4b, so that the exhaust gas which flows out of the nitrogen oxide storage catalytic converter elements 4a, 4b can be supplied to the SCR catalytic converter 5. In addition, a gas delivery unit 8, which can be used to supply an additional fluid via the switching device 6 to the first nitrogen oxide storage catalytic converter element 4a and/or the second nitrogen oxide storage catalytic converter element 4b as desired, is provided in the embodiment illustrated in FIG. 3. Peripheral supply components assigned to the gas delivery unit 6, such as lines and the like, are not illustrated for reasons of clarity but are provided as required. The gas delivery unit 6 may be designed, for example, as a metering unit and/or an evaporator for a liquid reducing agent which is present on board an associated vehicle. However, it is preferably designed as a fuel burner or a fuel reformer, which can be used to burn a fuel available on board the associated vehicle or to convert it into a gas by a reforming process. The text which follows refers to a fuel reformer 6, for the sake of simplicity.

It is provided that the fuel reformer 6 can be operated with an air/fuel ratio $\lambda_R$ which varies within wide limits. Preferred operating modes are in this case operation with a low excess of air, i.e. with an air/fuel ratio of approximately $\lambda_R=1.05$ or less, and an operating mode with a relatively high excess of fuel, approximately corresponding to $\lambda_R=0.5$ or less. In the former case, it generates a weakly oxidizing gas with a low oxygen content of approximately 0.5%, while in the latter case it generates a virtually oxygen-free reducing gas with a relatively high reducing agent content. It is preferable for the reducing gas to have a high hydrogen content, which is achieved, for example, by a catalytically assisted reforming process, if appropriate utilizing the water gas shift reaction. The text which follows refers for the sake of simplicity to an oxidizing or reducing reformer gas.

The text which follows explains a preferred way of operating the arrangement illustrated in FIG. 3 with reference to FIG. 2. Consideration will be lent first of all to the first nitrogen oxide storage catalytic converter element 4a arranged in the exhaust-gas branch 3a. This is initially operated in the first operating mode I. For this purpose, the switching device 6 is switched in such a way that the first nitrogen oxide storage catalytic converter element 4a is acted on predominantly by the exhaust-gas stream from the lean-burn diesel engine 1, with NOx being removed from the exhaust gas by being accumulated in the catalyst material. Any residual quantities of NOx which pass through as NOx slippage are broken down in the downstream SCR catalytic converter 5. If a predeterminable saturation state of the first nitrogen oxide storage catalytic converter element 4a is present, the switching device 6 is switched in such a way that now the first nitrogen oxide storage catalytic converter element 4a is predominantly isolated from the exhaust-gas stream of the diesel engine 1, which continues to be operated under lean-burn conditions. At the same time, the first nitrogen oxide storage catalytic converter element 4a is supplied by the fuel reformer 6 with a weakly oxidizing reformer gas via the switching device 6 and is therefore operated in the third operating mode III. The gas with a high oxygen content from the first operating mode I which was previously set is during this time flushed out of the exhaust pipe 3a and the first nitrogen oxide storage catalytic converter element 4a and is predominantly replaced by the weakly oxidizing reformer gas.

If the purging operation is concluded, as is the case after a quantity of reformer gas determined by the available geometries has been supplied, the first nitrogen oxide storage catalytic converter element 4a, with an unchanged setting of the switching device 6, is acted on by reducing, oxygen-free reformer gas and is therefore operated in the second operating mode II. As a result, the nitrate regeneration of the first nitrogen oxide storage catalytic converter element 4a is set in motion, with a particularly high proportion of the accumulated NOx being reduced to $NH_3$ on account of the preceding flushing operation. This $NH_3$ is supplied to the downstream SCR catalytic converter 5, where it is accumulated. It is advantageous that only a small stream of reformer gas has to be provided for the purpose of nitrate regeneration of the first nitrogen oxide storage catalytic converter element 4a, which has been predominantly isolated from the exhaust-gas stream of the diesel engine 1. Therefore, the reducing reformer gas has a correspondingly long residence time in the first nitrogen oxide storage catalytic converter element 4a, which likewise improves the $NH_3$ yield. To further boost the $NH_3$ yield, it is advantageous if the reformer gas supplied to the first nitrogen oxide storage catalytic converter element 4a in the second operating mode II has a high hydrogen content.

When it is established that the nitrate regeneration of the first nitrogen oxide storage catalytic converter element 4a has concluded, either by sensor means or on a model basis, the switching device 6 is switched back, so that the lean exhaust gas output by the diesel engine 1 is once again passed primarily via the first nitrogen oxide storage catalytic converter element 4a.

The second nitrogen oxide storage catalytic converter element 4b is operated in a time-offset, complementary fashion with respect to the operating modes I, II, III which have been set for the first nitrogen oxide storage catalytic converter element 4a. When the first operating mode I is set for the first nitrogen oxide storage catalytic converter element 4a, therefore, the second nitrogen oxide storage catalytic converter element 4b is operated in the second operating mode II or in the third operating mode III. The procedures which have been explained above are carried out in a similar form.

Figure 4:
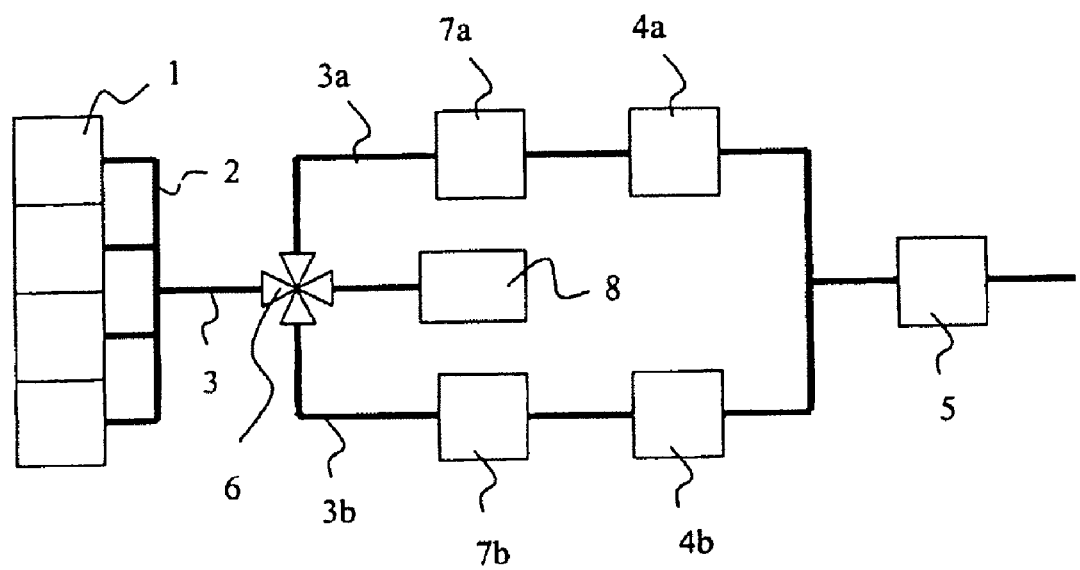
FIG. 4 shows a schematic block diagram of a third embodiment of an internal combustion engine with associated exhaust-gas purification system with nitrogen oxide storage catalytic converter and SCR catalytic converter.

FIG. 4 illustrates a schematic block diagram of a further advantageous embodiment of the internal combustion engine according to the invention with associated exhaust-gas purification system with nitrogen oxide storage catalytic converter and SCR catalytic converter, components which are functionally equivalent to those shown in FIG. 3 being denoted by the same reference designations. The embodiment illustrated in FIG. 4 differs from that shown in FIG. 3 by virtue of the fact that a first oxidation catalytic converter element 7a is connected upstream of the first nitrogen oxide storage catalytic converter element 4a in the exhaust pipe branch 3a and a second oxidation catalytic converter element 7b is connected upstream of the second nitrogen oxide storage catalytic converter element 4b in the exhaust pipe branch 3b.

The embodiment illustrated in FIG. 4 can in principle be operated in the same way as the embodiment illustrated in FIG. 3. However, there are a number of additional options. To avoid repetition, the text which follows deals only with the differences which are present with respect to the embodiment illustrated in FIG. 3. These differences are mainly brought about by the oxidation catalytic converter elements 7a, 7b. These are able to lower the oxygen content of the exhaust gas supplied to them in accordance with the reducing agent present in the exhaust gas. Therefore, in particular when a nitrogen oxide storage catalytic converter element 4a, 4b is operating in the third operating mode III, it is possible to prevent oxygen-containing exhaust gas being supplied to it from the diesel engine 1, which is operating in lean-burn mode, as a result of apparatus-related or deliberately set leakage of the switching device 6. For this purpose, reducing reformer gas is supplied to the respective exhaust-gas branch 3a, 3b from the fuel reformer 6. It is preferable for the fuel reformer to be operated in such a way that the quantity of reducing agent which it supplies to the respective exhaust-gas branch 3a, 3b via the switching device 6 is sufficient to remove the oxygen flowing into this exhaust-gas branch via the switching device 6 from the exhaust gas. As a result, oxygen, which is disruptive to the formation of $NH_3$ as described above, is flushed out of the corresponding exhaust pipe branch 3a, 3b or the nitrogen oxide storage catalytic converter element 4a, 4b or is prevented from penetrating into these components. The reformer is operated in such a way that the air/fuel ratio $\lambda_A$ corresponding to the third operating mode III or the second operating mode II in accordance with FIG. 2 is set on the inlet side of the respective nitrogen oxide storage catalytic converter 4a, 4b. To keep the demand for reducing agent at a low level, it is advantageous for a catalytic coating with little or no oxygen storage function to be provided for the oxidation catalytic converter elements 7a, 7b.

The heat of reaction which is released at the respective oxidation catalytic converter element 7a, 7b during the oxidation of reducing agent which takes place there can advantageously be used for heat management of the downstream nitrogen oxide storage catalytic converter element 4a, 4b. For this purpose, it is expedient for the switching device to be of continuously variably adjustable design. In this way, predeterminable quantities of the exhaust gas output by the lean-burn diesel engine 1 can be passed into the exhaust pipe branch 3a, 3b of the nitrogen oxide storage catalytic converter element 4a, 4b which is operating in the second operating mode II or in the third operating mode III. As a result, the heat of reaction released in the oxidation catalytic converter element 7a, 7b can be used to heat the respective nitrogen oxide storage catalytic converter element 4a, 4b to the optimum operating temperature. In particular, this also allows increased heating, for example to carry out a sulfur regeneration.

It may furthermore be advantageous for a gas delivery device designed as a fuel metering device, which can be used to supply liquid or vaporized fuel to the exhaust gas on the inlet side of the oxidation catalytic converter elements 7a, 7b, to be provided instead of the reformer 8 for each of the exhaust pipe branches 3a, 3b. The conditions in the exhaust pipe branches 3a, 3b which are required for the individual operating modes I, II, III can be set by supplying fuel with quantitative open-loop or closed-loop control in conjunction with a correspondingly set supply of lean exhaust gas via the switching device 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for purifying the exhaust gas from an internal combustion engine having an exhaust-gas purification system including a nitrogen oxide storage catalytic converter and an SCR catalytic converter downstream of the nitrogen oxide storage catalytic converter, comprising the steps of:
    supplying the nitrogen oxide storage catalytic converter with exhaust gas containing an excess of oxidizing constituents;
    supplying the nitrogen oxide storage catalytic converter with exhaust gas containing an excess of reducing constituents; and
    supplying the nitrogen oxide storage catalytic converter, between the oxidizing constituents supplying step and the reducing constituents supplying step, with an exhaust gas which has a lower content of oxidizing constituents than in the oxidizing constituents supplying step and a lower content of reducing constituents than in the reducing constituents supplying step,
    wherein the step between the oxidizing constituents supplying step and the reducing constituents supplying step is terminated at the earliest when the nitrogen oxide storage catalytic converter is predominantly filled by exhaust gas delivered in step between the oxidizing constituents supplying step and the reducing constituents supplying step.

2. The method as claimed in claim 1, wherein
    the nitrogen oxide storage catalytic converter is formed as a parallel arrangement of a first nitrogen oxide storage catalytic converter element and a second nitrogen oxide storage catalytic converter element, and
    the first nitrogen oxide storage catalytic converter element and the second nitrogen oxide storage catalytic converter element are operated alternately by switching of a switching device arranged to selectively direct exhaust gas into said elements.

3. A method for purifying the exhaust gas from an internal combustion engine having an exhaust-gas purification system including a nitrogen oxide storage catalytic converter and an SCR catalytic converter downstream of the nitrogen oxide storage catalytic converter, comprising the steps of:
    supplying the nitrogen oxide storage catalytic converter with exhaust gas containing an excess of oxidizing constituents;
    supplying the nitrogen oxide storage catalytic converter with exhaust gas containing an excess of reducing constituents; and
    supplying the nitrogen oxide storage catalytic converter, between the oxidizing constituents supplying step and the reducing constituents supplying step, for a predetermined period with a constant exhaust gas composition which has a lower content of oxidizing constituents than in the oxidizing constituents supplying step and a lower content of reducing constituents than in the reducing constituents supplying step,
    wherein in step of supplying the nitrogen oxide storage catalytic converter between the oxidizing constituents supplying step and the reducing constituents supplying step, an air/fuel ratio which set to control exhaust gas composition is set to be slightly greater than 1, such that the oxidizing constituents in the exhaust gas have an oxygen excess of 1% or less.

4. The method as claimed in claim 3, wherein the air/fuel ratio is approximately 1.05.

* * * * *